A. C. ISRAEL.
Nut-Lock Washer.
No. 227,111. Patented May 4, 1880.
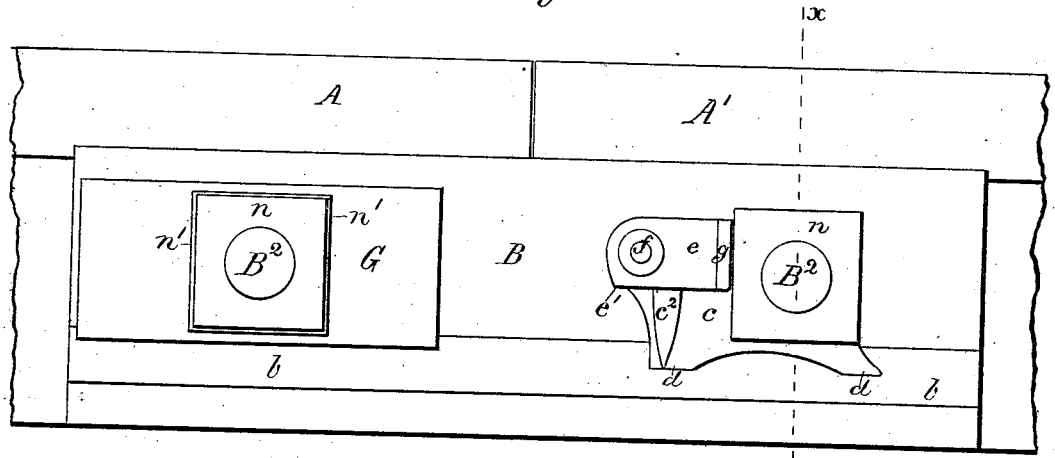
Fig. 1.
Fig. 2.
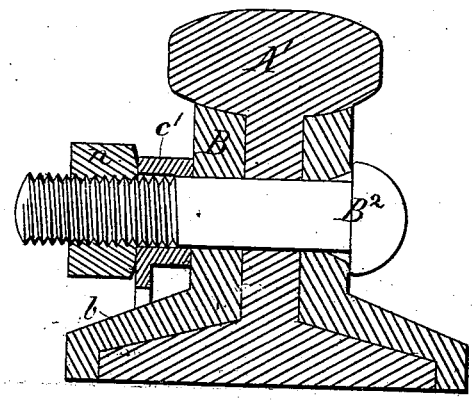
Fig. 3.
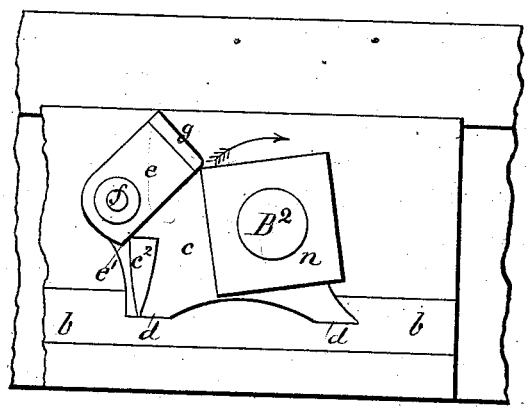
Fig. 4.
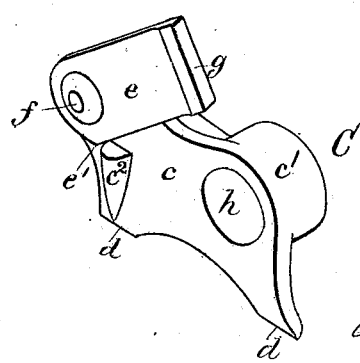
Witnesses:
J. P. Theodore Lang.
J. Russell Bart
Inventor:
Alexander C. Israel
by Mason, Fenwick & Lawrence
his Att'ys

UNITED STATES PATENT OFFICE.

ALEXANDER C. ISRAEL, OF KIMMSWICK, ASSIGNOR OF ONE-HALF OF HIS RIGHT TO A. T. HARLOW, OF ST. LOUIS, MISSOURI.

NUT-LOCK WASHER.

SPECIFICATION forming part of Letters Patent No. 227,111, dated May 4, 1880.

Application filed February 4, 1880.

*To all whom it may concern:*

Be it known that I, ALEXANDER C. ISRAEL, a citizen of the United States, residing at Kimmswick, in the county of Jefferson and State of Missouri, have invented a new, useful, and Improved Nut-Lock Washer for Railroad-Rails, of which the following is a full, clear, and exact specification, reference being had to the accompanying drawings, forming a part thereof, in which drawings—

Figure 1 represents my improved nut-lock washer applied in working position to a railroad-rail and the fish-bars thereof in order to hold the adjoining ends of rails fixedly in the true line of the track. Fig. 2 is a transverse section in the line $x\ x$ of Fig. 1. Fig. 3 is a side elevation, showing the bolt-nut in the act of being screwed upon the bolt which passes through one of the rails and the fish-bars on either side of the rail and against my improved nut-lock washer. Fig. 4 is a perspective view of my improved nut-lock washer.

The object of my invention is to provide a nut-lock washer which shall hold the nuts to their place on bolts used in joining together the ends of the rails of a railroad-track and not become loose under the jarring action of trains of cars passing upon the track, and which at the same time shall be so constructed that when the nut is being screwed home upon the bolt the nut will be a sufficient distance from the fish-bar to allow the nut to revolve without striking the flange of the fish-bar.

The detail perspective view, Fig. 4, represents my improved nut-lock washer C, the same being made either of cast malleable iron or of wrought-iron. It is cast or made in one piece, save the latch $e$ and pivot-pin $f$, which confines the latch upon the body portion $c$. Said body portion $c$ of the washer is provided with a rearward extension, as at $c'$, having a perforation, $h$, through it for the passage of the bolt $B^2$ when the several parts are in working position, as clearly indicated in Fig. 2. The washer C is also provided with downward projections or rests, as at $d\ d$, which rest upon the flange $b$ of the fish-bar B when the tubular extension $c'$ is brought up against the fish-bar B, as in Fig. 2. It is also provided with a projection or stop, as at $c^2$, upon which a latch, $e$, pivoted at $f$ to the body portion $c$, rests when said latch is in the position shown in Fig. 1, and in which position the enlarged end $g$ of the latch abuts against one side of the nut $n$, thereby preventing the unscrewing of the nut so long as the latch remains in such position.

It will be seen that the latch $e$ is pivoted at $f$ in rear of the stop $c^2$, and in such relation thereto that when the latch is at its highest throw the end $e'$ of the latch will strike against the stop $c^2$, thereby preventing the latch from being thrown over into a position from which it would not by its own gravity be constantly inclined to fall into a locking contact with the nut. In other words, the latch $e$, when at its highest upward throw, has a constant tendency, by reason of its own gravity, to fall back in contact with the nut $n$ and lock it in the position as signified in Fig. 1, said nut, while being rotated in the direction of the arrow, Fig. 3, in the act of screwing up, striking against and raising the latch until it is screwed home, at which instant the latch falls down against one side of the nut, as shown in Fig. 1, thereby preventing the unscrewing of the nut from any causes incident to the passage of a train of cars over the track.

In Fig. 1, G represents a wooden strap of considerable thickness, held against the fish-bar B by a screw-bolt, $B^2$, and a nut, $n$, and an interposed thin flat washer, $n'$, the use of the wooden strap or piece G being to add to the thickness of the fish-bar B sufficiently to enable the nut $n$ to revolve and screw up without striking against the flange $b$ of the fish-bar B, this being the old style of confining the fish-bars in place against adjoining rails A A' to hold the rails in proper position and still in use upon many railroad-tracks.

By my invention this objectionable old-style use of a wooden strap or piece, G, is obviated by reason of the tubular extension $c'$ of my improved washer C, which extension $c'$ allows the nut to be screwed up against the body portion $c$ of the washer without striking against the flange $b$ of the fish-bar B, while at the same time means are provided whereby the nut, when screwed up, is fixedly held in a locked position.

Heretofore nut-locking washers have not been provided with a rear extension, a base-support, and a pivoted stop combined, but it has been common to provide a washer with a rear extension and a gravitating base-extension; also, to provide a washer with base-supports, and also to provide a washer with a base-support and a pivoted locking-stop.

My nut-locking washer performs the office of locking the nut, setting it out, so that it may be turned without striking the base of the rail or fish-bar, and at the same time it is supported at its base so as not to be liable to turn.

I claim—

A washer adapted for use for confining fish-bars on either side of adjoining railroad-rails, consisting of a body portion, $c$, a rearward extension, $c'$, a pivoted latch, $e$, and stop $c^2$, substantially as and for the purpose described.

Signed in presence of two subscribing witnesses.

ALEXANDER C. ISRAEL.

Witnesses:
A. T. HARLOW,
E. H. CLARK.